United States Patent [19]

Shipman et al.

[11] Patent Number: 5,440,447
[45] Date of Patent: Aug. 8, 1995

[54] HIGH TEMPERATURE FEED-THROUGH SYSTEM AND METHOD FOR MAKING SAME

[75] Inventors: Thomas W. Shipman, Rochester; David J. Bealka, East Freetown; Timothy J. Brown, Mattapoisett, all of Mass.

[73] Assignee: The Morgan Crucible Company, plc, Windsor, England

[21] Appl. No.: 87,988

[22] Filed: Jul. 2, 1993

[51] Int. Cl.⁶ .................. H01G 2/04; H01G 4/236
[52] U.S. Cl. ................. 361/302; 361/274.1; 333/182
[58] Field of Search .............. 361/272, 274.1, 274.3, 361/275.1, 275.4, 302, 306.1, 307, 321.6; 333/182–185; 174/152 GM; 439/620

[56] References Cited

U.S. PATENT DOCUMENTS

| | | |
|---|---|---|
| 2,756,375 | 7/1956 | Peck . |
| 3,243,671 | 3/1966 | Heron, Jr. et al. . |
| 3,266,121 | 8/1966 | Rayburn . |
| 3,538,464 | 11/1970 | Walsh . |
| 4,041,587 | 8/1977 | Kraus . |
| 4,148,003 | 4/1979 | Colburn et al. . |
| 4,314,213 | 2/1982 | Wakino . |
| 4,424,551 | 1/1984 | Stevenson et al. . |
| 4,660,907 | 4/1987 | Belter . |
| 4,887,185 | 12/1989 | Okumura ............... 361/302 |
| 4,935,842 | 6/1990 | Carlson et al. ......... 361/302 |
| 4,950,185 | 8/1990 | Boutros ............... 439/620 |
| 5,032,692 | 7/1991 | DeVolder . |

FOREIGN PATENT DOCUMENTS

| | | |
|---|---|---|
| 2309967 | 11/1976 | France . |
| 3-218004 | 9/1991 | Japan ............... 361/302 |
| WO91/01565 | 2/1991 | WIPO . |

OTHER PUBLICATIONS

P. Barnes & P. Czulo, "Filtered Connectors for the Military," *Connection Technology* 18–20 (May 1992).

*Primary Examiner*—Bruce A. Reynolds
*Assistant Examiner*—Gregory L. Mills
*Attorney, Agent, or Firm*—Dean W. Russell; Kilpatrick & Cody

[57] ABSTRACT

An electronic feed-through system that is adapted for use in situations in which the feed-through is bonded to a container or the like by a process that subjects the feed-through system to heating. The feed-through system includes an electrically conductive structure adapted to be attached to a second structure at a first location on the conductive structure. The conductive structure has an electrically conducting member connected to the first location. A portion of the conductive structure is subjected to heat during said attachment. The feed-through system also includes an electronic component such as a feed-through capacitor. The electronic component requires electrical connection to the conducting member and placement in proximate spaced relation to the conducting member. An electrically conducting thermally resistant bridge is used to connect the electronic component to the conducting member and maintain the component in the spaced relationship with the member.

14 Claims, 6 Drawing Sheets

HIGH TEMPERATURE FEED-THROUGH SYSTEM AND METHOD FOR MAKING SAME

FIELD OF THE INVENTION

The present invention relates to electronic components, and more particularly, an improved feed-through system for applications requiring the mounting of electronic components on or near the feed-through.

BACKGROUND OF THE INVENTION

Feed-throughs are well known in the industry and are commonly used to provide electrically conductive paths through the walls of various containers. In many instances, unwanted high-frequency signals generated inside or outside of the container pass through the feed-through and cause problems for circuitry outside or inside the container, respectively.

In an effort to alleviate interference from such sources, various filtering devices and/or techniques have been employed, such as ceramic capacitors. Feed-throughs with capacitors are intended primarily to pass relatively low frequency electrical signals via a lead or conductor through an opening in a conducting wall, screen or the like while presenting a low impedance shunt path to the conducting wall for high frequency signals. Capacitors of this type are disclosed in U.S. Pat. Nos. 3,243,671 and 2,756,375.

This type of feed-through arrangement is commonly used in electronic systems such as heart pacemakers, missiles, satellites, and space probes. Illustrative are the feed-through capacitor systems disclosed in U.S. Pat. Nos. 5,032,692, 4,424,551, 4,314,213 and 4,148,003.

To maximize the effectiveness of such filter systems, the feed-through capacitor must be mounted as close to the feed-through as possible. The outside surface of the capacitor is typically covered by a metallic electrode that is connected to the container wall. By positioning the capacitor adjacent to the feed-through, the capacitor becomes a continuation of the container wall. In effect, the container wall "covers" most of the insulator when the capacitor is so positioned. If the high-frequency filter is mounted on a circuit board in the container, the lead from the filter to the feed through can act as an antenna which collects and transmits the high frequency electromagnetic radiation present in the container. Hence, the length of unshielded conductor from the final filter to the wall of the container must be minimized. One method for accomplishing this goal makes use of a feed-through capacitor mounted on the feed-through.

The above described system requires that the capacitor be attached to the feed-through. One method for providing this attachment relies on bonding the capacitor to the feed-through using epoxy. This approach has a number of drawbacks. First, epoxies are difficult to apply, particularly on small packages. This results in higher labor costs and lower yields. Second, epoxies are unstable at temperatures above 175° C. Such temperatures are often encountered when the feed-through assembly is attached to the container via welding or brazing. Third, it is difficult to inspect the assembled part.

One alternative to epoxy attachment is disclosed in U.S. Pat. No. 5,032,692. In this system the capacitor attachment is achieved through the use of brazing alloy rings. The capacitor is brazed into a shielded compartment in the feed-through. While this method eliminates the use of epoxies, it requires capacitors that are capable of withstanding very high temperatures. The use of such capacitors increases the cost of the feed through system.

Broadly, it is the object of the present invention to provide an improved feed-through system.

It is another object of the present invention to provide an electronic feed-through/filter system in which the electronic components mounted on the feed-through are protected from heat transfer during subsequent processing.

It is a further object of the present invention to provide an electronic feed-through filter system which can be more easily inspected after assembly.

Other objects of the invention will become apparent to those skilled in the art from the following description and accompanying drawings.

SUMMARY OF THE INVENTION

The present invention is an electronic feed-through system that is adapted for use in situations in which the feed-through is bonded to a container or the like by a process that subjects the feed-through system to heating. A feed-through system according to the present invention includes an electrically conductive structure adapted to be attached to a second structure at a first location on the conductive structure. The conductive structure has an electrically conducting member connected to the first location. A portion of the conductive structure is subjected to heat during said attachment. The feed-through system also includes an electronic component such as a feed-through capacitor. The electronic component requires electrical connection to the conducting member and placement in proximate spaced relation to the conducting member. An electrically conducting thermally resistant bridge is used to connect the electronic component to the conducting member and maintain the component in the spaced relationship with the member. The bridge has a thermal resistance greater than the thermal resistance of the member; hence, the bridge impedes the flow of heat to the electronic component during the attachment of the feed-through to the container.

BRIEF DESCRIPTION OF THE DRAWINGS

Further features and advantages will become apparent from the following and more particular description of the preferred embodiment of the invention, as illustrated in the accompanying drawings, in which like referenced characters generally refer to the same parts or elements throughout the views.

DETAILED DESCRIPTION OF THE INVENTION

The present invention will be described with reference to a hermetically sealed electronic feed-through system utilizing a feed-through capacitor. It will, however, be recognized by one skilled in the art that the invention may be employed in feed-through systems which do not require hermetic sealing and/or which utilize other electronic or heat sensitive components.

Figure 1:
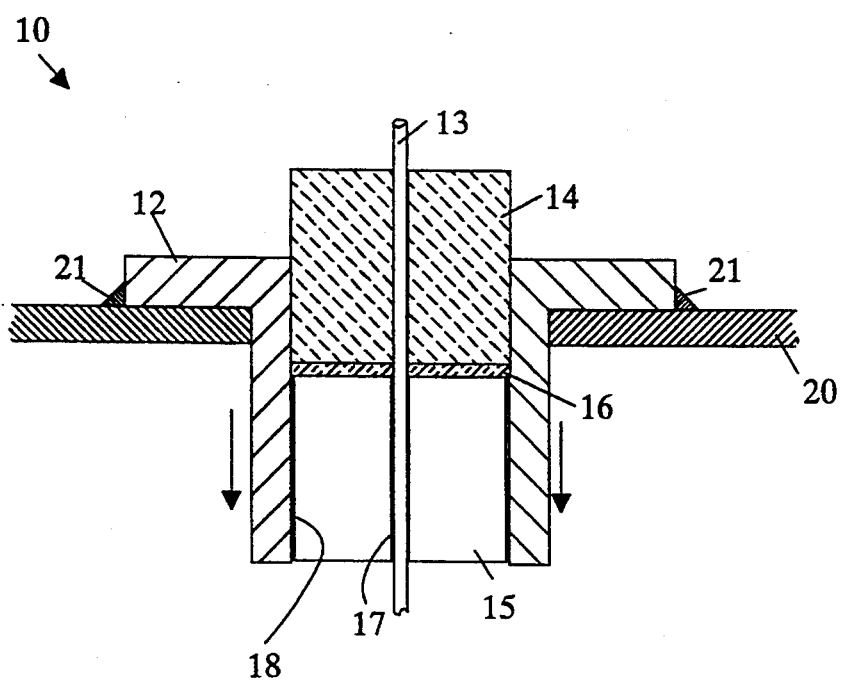
FIG. 1 is a cross-sectional view of a prior art feed-through system.

The manner in which the present invention achieves its advantages over the prior art may be more easily understood with reference to FIG. 1 which is a cross-sectional view of a typical prior art feed-through system 10 utilizing epoxy bonding. The feed-through system 10 generally comprises a housing 12, an electrical conductor 13 extending through a hole in an insulator 14. A feed-through capacitor 15 is disposed within the housing 12. An epoxy layer 16 is employed to secure the feed-through capacitor into housing 12. Feed-through capacitor 15 has two electrodes, electrode 17 on the inside surface providing electrical connection to conductor 13 and electrode 18 on the outside surface providing electrical connection to housing 12.

After assembling feed-through system 10, it is typically attached to the wall 20 of a container by high temperature brazing or welding. The temperatures at interface 21 can result in a significant transfer of heat along the walls of housing 12 as shown by the arrows in FIG. 1. The amount of heat actually transferred from interface 21 to the epoxied feed-through capacitor 15 can be sufficient to damage feed-through capacitor 15 or to cause the epoxy bond to fail. This problem is particularly acute in systems in which the feed-through system has a small thermal mass.

Figure 2:
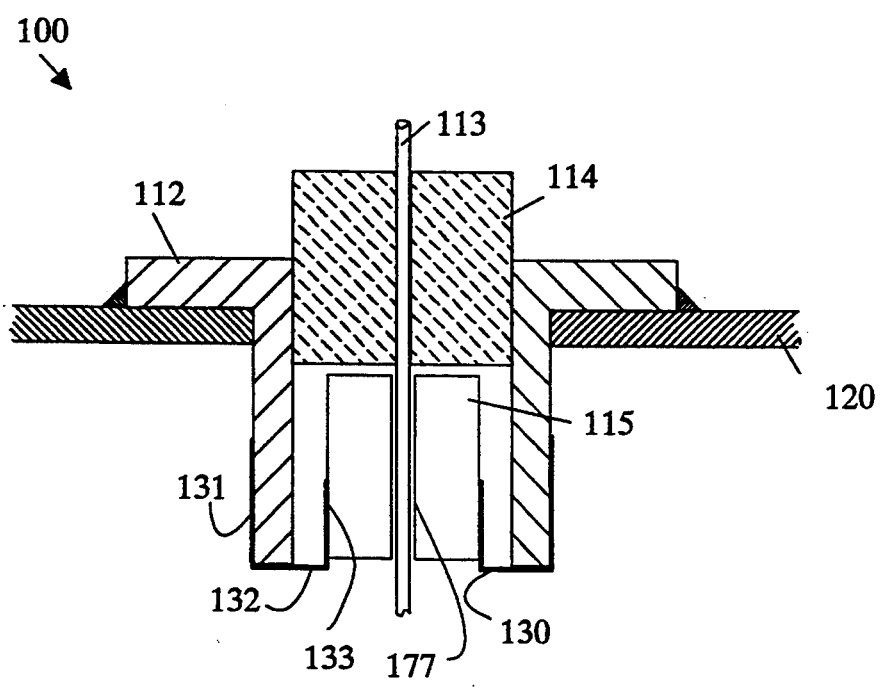
FIG. 2 is a cross-sectional view of a feed-through system according to the present invention.

The present invention utilizes an electrically conducting bridge to connect the feed-through capacitor to the wall of the feed-through housing while limiting the amount of heat that can flow from the feed-through wall to the capacitor during the attachment of the feed-through system to the container. Refer now to FIG. 2 which is a cross-sectional view of a feed-through system 100 according to the present invention. In FIG. 2 and subsequent figures, elements that serve analogous functions to elements shown in FIG. 1 have been assigned numbers that differ from those in FIG. 1 by 100, 200, etc. Feed-through system 100 provides a conducting path for conductor 113 through the wall 120 of a container via insulator 114. Feed-through system 100 is adapted for connection to wall 120 by welding of outer wall 112 to the wall 120. Wall 112 also provides the electrical connection between one terminal of feed-through capacitor 115 and wall 120. An electrically conducting bridge 130 provides the electrical connection between wall 112 and the outer surface of feed-through capacitor 115.

Bridge 130 has three regions. The first region 131 connects the bridge to wall 112. The second region 133 connects the bridge to feed-through capacitor 115. Capacitor 115 has a second electrode disposed on the inside surface of region 177 that is connected to lead 113 by the application of a conductive bonding agent. The third region 132 provides heat shielding as well as electrical connection between the first and second regions. In the preferred embodiment of the present invention, the cross-sectional area of region 132 is significantly less than the cross-sectional area of wall 112. Hence, the thermal resistance of region 132 is substantially greater than that of wall 112. The region of increased thermal resistance slows the flow of heat from wall 112 to feed-through capacitor 115 during the attachment of feed-through system 100 to container 120. Bridge 130 may be constructed from any electrically conducting material. In the preferred embodiment of the present invention, bridge 130 is constructed from a nickel ribbon.

Figure 3:
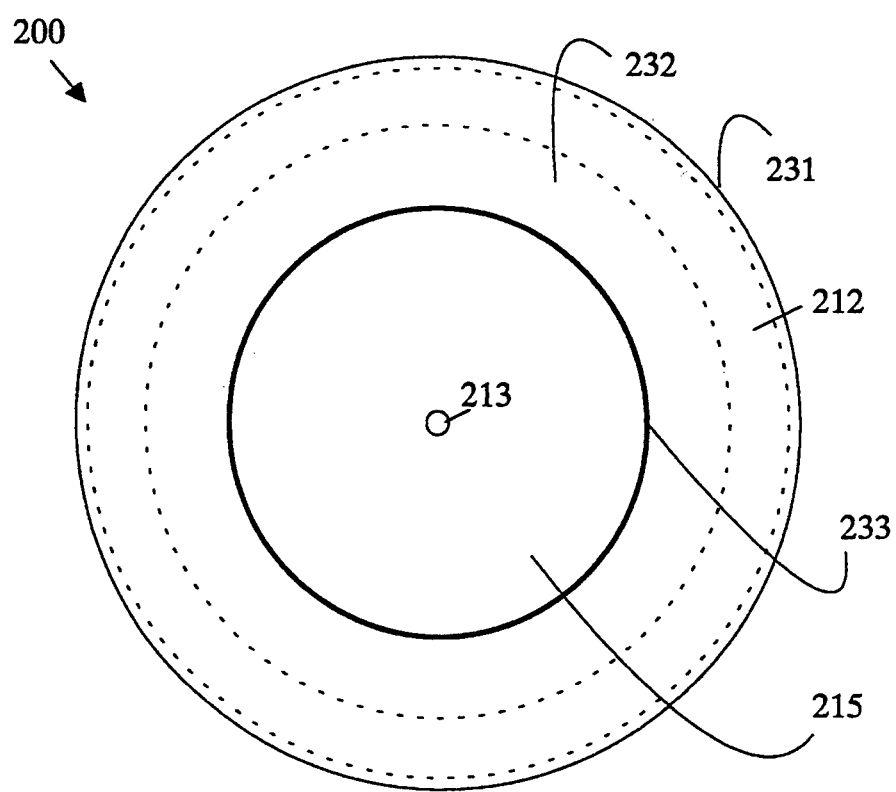
FIG. 3 is a bottom view of one embodiment of a feed-through system according to the present invention.

In the preferred embodiment of the present invention, the bridge completely surrounds the feed-through capacitor as shown in FIG. 3 which is an bottom view of a feed-through system 200 according to the present invention. A bridge comprising regions 231–233 is attached to wall 212 of feed-through system 200 by bonding region 231 to wall 212. The bridge is connected to the outer wall of feed-through capacitor 215 by bonding region 233 to feed-through capacitor 215. Region 232 of the bridge provides thermal isolation. Both of the bonds described above must be electrically conducting. Feed-through capacitor 215 has a hole therein for connection to lead 213. The arrangement shown in FIG. 3 is preferred because the bridge provides a shield against electromagnetic radiation. That is, there is no possibility of electromagnetic radiation passing between feed-through capacitor 215 and wall 212 and then exiting via insulator 114 shown in FIG. 2. However, this arrangement does not minimize the cross-sectional area of region 232; hence, it does not provide the maximum thermal isolation.

Figure 4:
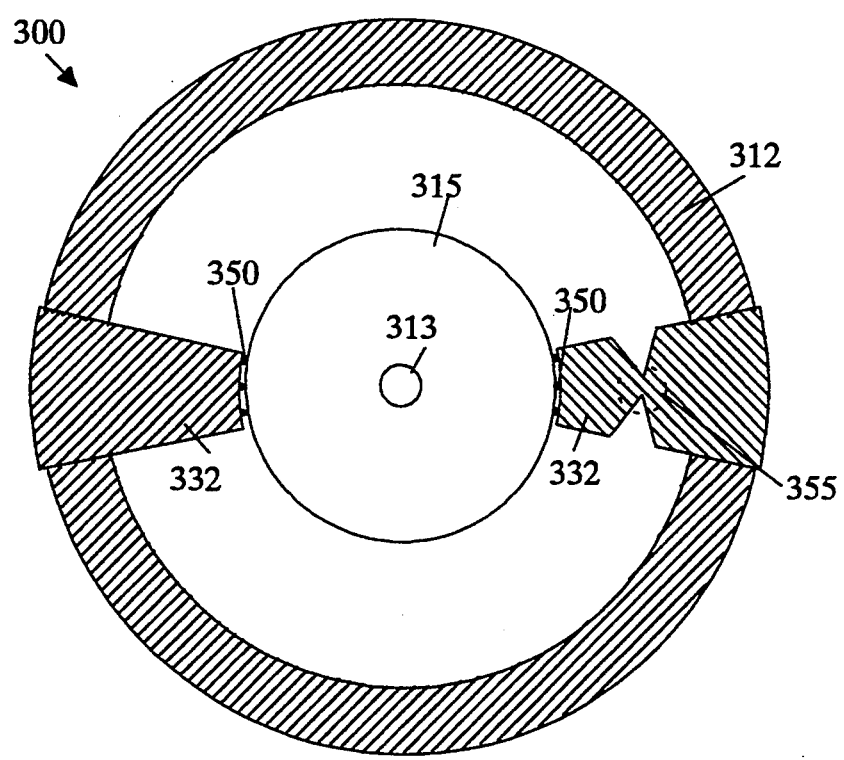
FIG. 4 is a bottom view of another embodiment of a feed-through system according to the present invention.

A bottom view of a second embodiment of the present invention that provides improved thermal isolation is shown in FIG. 4 at 300. In this embodiment, the bridge region 332 consists of thin ribbon extending from the outer wall 312 of the feed-through to the outer electrode of feed-through capacitor 315. The center electrode of feed-through capacitor 315 being connected to conductor 313.

The thermal resistance of region 332 may be controlled by controlling the cross-sectional area of the region and/or the material from which the region is constructed. The cross-sectional area may adjusted by cutting notches in region 332 to form a small restricted bridge region as shown at 355. Similarly, region 332 or region 355 could be constructed from a material having a higher thermal resistance than wall 312. For example, nickel or a nickel-iron alloy may be used to provide regions of increased thermal resistance.

The connection to feed-through capacitor 315 may be made with the aid of spot welds such as those shown at 350. For the purpose of this discussion, the term "spot weld" shall be defined to include any method of attachment in which a small conducting area is created between two surfaces. Small areas of brazing alloys or other conductive bonding agents may be present between the two surfaces. The spot welds further limit the cross-sectional area of the bridge that is available to transfer heat to feed-through capacitor 315. If bonding is accomplished with an alloy layer that bonds the bridge to feed-through capacitor 315 and the alloy has a sufficiently low melting temperature, the bond may be used to implement a "thermal fuse" that will break if the feed-through is overheated during attachment to the container. Visual inspection of the bond can then be used to identify components that were overheated during assembly. Thus, parts that might fail in service may be eliminated before being placed in service.

It should also be noted that the spot welds may be introduced between feed through wall 312 and the portion of region 332 that is adjacent thereto. This method of spot welding to provide a thermal fuse provides some additional advantages, since the temperature at which the weld is designed to fail will be greater than that of the welds shown at 350. There are more choices of alloys for the spot welds if the failure temperature is higher.

It should also be noted that the "thermal fuse" can be provided by region 332 or region 355. This may be accomplished by utilizing a material that melts when subjected to heating beyond a predetermined temperature.

Figure 5:
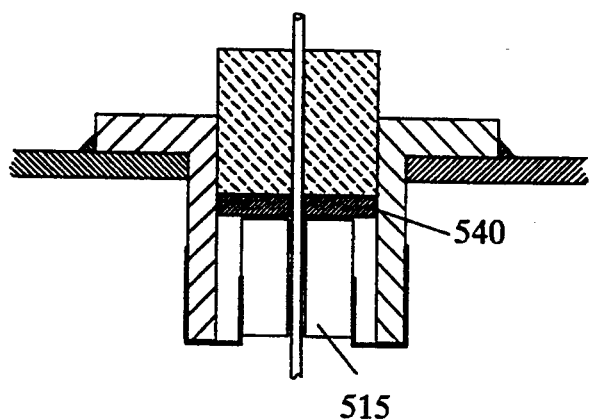
FIG. 5 is a cross-sectional view of another embodiment of a feed-through system according to the present invention.
Figure 6:
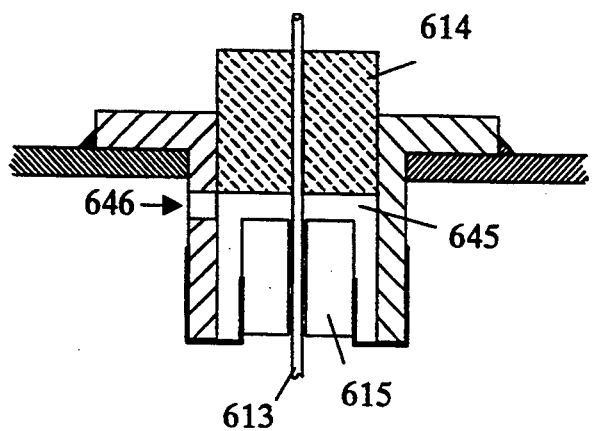
FIG. 6 is a cross-sectional view of another embodiment of a feed-through system according to the present invention.

In addition to providing thermal insulation of the feed-through capacitor, the present invention provides a means for positioning the feed-through capacitor in the feed-through. The feed-through capacitor may be positioned adjacent to the insulator 114 as shown in FIG. 2 or it may be spaced therefrom as shown in FIGS. 5 and 6. Referring to FIG. 5, a spacer 540 may be used to set the distance between the feed-through capacitor shown at 515 and the insulator. Referring to FIG. 6, if the space 645 between feed-through capacitor 615 and insulator 614 is not filled by a spacer, one or more ports such as port 646 accessing the portion of lead 613 within space 645 may be provided. This port may be used to visually inspect lead 613 or make test connections thereto. Such ports may also be used to inspect the insulator 614 during testing of the hermetic seal or to inspect the top side of capacitor 615.

The configuration shown in FIGS. 4–6 also allows for the use of a flexible connecting ribbon to accommodate any thermal expansion mis-match during the attachment of the feed-through system to the container.

Figure 7:
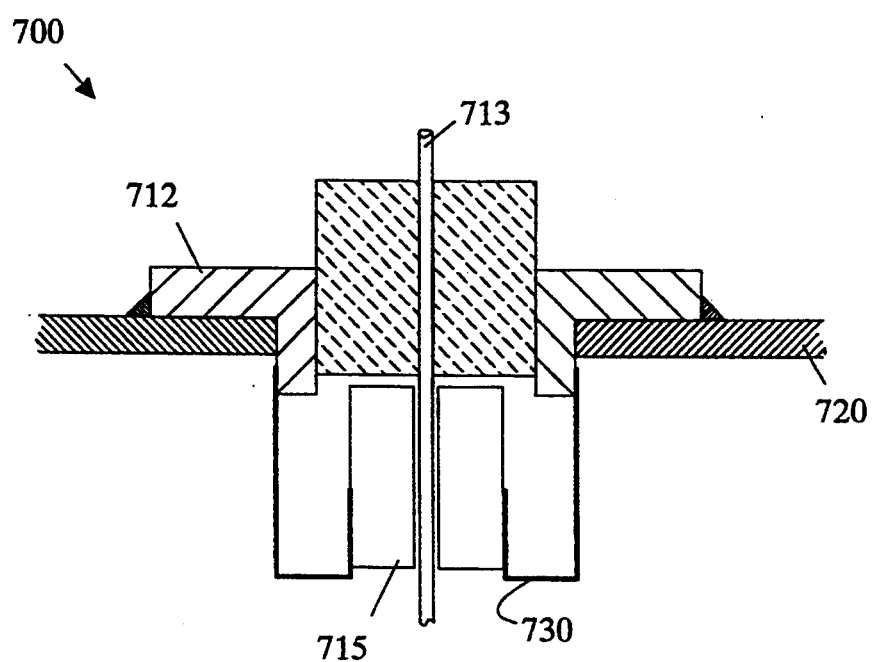
FIG. 7 is a cross-sectional view of another embodiment of a feed-through system according to the present invention.

While the above described embodiments of the present invention have referred to a feed-through wall that extends below the feed-through capacitor, other configurations will be apparent to those skilled in the art. Referring again to FIG. 2, feed-through wall 112 provides structural support for attaching bridge 130 and, in combination with bridge 130, provides a ground shield that isolates the portion of lead 113 that passes through insulator 114. In addition, the ground shield prevents electromagnetic radiation from escaping from the container via insulator 114. However, bridge 130 may also provide these functions as shown at 700 in FIG. 7. In this embodiment of the present invention, bridge 730 connects to feed-through wall 712 which does not extend below feed-through capacitor 715. Bridge 730 provides the electrical shielding of feed-through capacitor and lead 713.

Although the above described embodiments of the present invention are directed to a feed-through system with one lead 113, it will be apparent to those skilled in the art that systems having a plurality of leads may also be constructed according to the present invention. It will also be apparent to those skilled in the art that the present invention may also be used to construct feed-through systems in which the feed-through is not cylindrical in shape.

Similarly, it will be apparent to those skilled in the art that the feed-through capacitor described in the above embodiments of the present invention could be replaced with any electrical component that must be positioned close to the container wall and connected thereto.

Without departing from the spirit and scope of this invention, one of ordinary skill can make various changes and modifications to the invention to adapt it to various uses and conditions. As such, these changes and modifications are properly, equitably, and intended to be, within the full range of equivalents of the following claims.

What is claimed is:

1. An electronic feed-through system comprising:
   an electrically conductive structure adapted to be attached to a second structure at a first location on said conductive structure, said conductive structure having an electrically conducting member connected to said first location, wherein a portion of said conductive structure is subjected to heat during said attachment;
   an electronic component electrically connected to said conducting member and placed in proximate spaced relation to said conducting member so as to define a void between said electronic component and said conducting member; and
   bridge means for electrically connecting said electronic component to said conducting member and maintaining said component in said spaced relation with said conducting member, said bridge means having a thermal resistance greater than the thermal resistance of said conducting member.

2. The feed-through system of claim 1 further comprising an electrical insulator having an electrical conductor passing therethrough wherein said electronic component is maintained in spaced relationship to said electrical insulator and connected to said electrical conductor.

3. The feed-through system of claim 2 further comprising an electrically insulating spacer disposed between said electronic component and said electrical insulator.

4. The feed-through system of claim 2 wherein said bridge means comprises an electronic shield for preventing electromagnetic radiation having a frequency above a predetermined frequency from passing through said feed-through system.

5. The feed-through system of claim 1 wherein said electronic component is a capacitor.

6. The feed-through system of claim 1 wherein said bridge means comprises a region that melts at a predetermined failure temperature.

7. The feed-through system of claim 1 wherein said bridge means comprises a region constructed from a material having a higher thermal resistivity than the thermal resistivity of said conducting member.

8. An electronic feed-through system comprising:
   an electrically conductive structure adapted to be attached to a second structure at a first location on said conductive structure, said conductive structure having an electrically conducting member connected to said first location and said conducting member having a cross-sectional area having a minimum value, wherein a portion of said conductive structure is subjected to heat during said attachment;
   an electronic component requiring electrical connection to said conducting member and placement in proximate spaced relation to said conducting member; and
   bridge means for electrically connecting said electronic component to said conducting member and maintaining said component in said spaced relation with said conducting member, said bridge means having a thermal resistance greater than the thermal resistance of said conducting member and comprising a metallic ribbon having a heat limiting region with a cross-sectional area less than the minimum value of the cross-sectional area of said conducting member, said heat limiting region being disposed between a connection to said conducting member and a connection to said electronic component.

9. The feed-through system of claim 2 wherein said connection to said conducting member or said connection to said electronic component comprises a spot weld.

10. The feed-through system of claim 9 wherein said spot weld comprises a material having a melting point below a predetermined failure temperature.

11. An electrical feed-through for a conductor comprising:
 a. an electrically conductive housing adapted for attachment to a structure by a process utilizing heat;
 b. an electronic component spaced from the conductive housing, the electrically conductive housing and electronic component being separated by a gap; and
 c. means, comprising an electrically conductive bridge having a thermal resistance greater than the thermal resistance of the electrically conductive housing, for bridging the gap between and electrically connecting the electrically conductive housing and the electronic component.

12. A feed-through according to claim 11 in which the electrically conductive housing and electronic component each has an exterior surface and the electrically conductive bridge is attached to the exterior surface of the electrically conductive housing and the exterior surface of the electronic component.

13. A feed-through according to claim 11 in which the electrically conductive bridge is attached to at least one of the electrically conductive housing and electronic component by a spot weld.

14. A feed-through according to claim 12 in which the electrically conductive bridge is attached to at least one of the electrically conductive housing and electronic component by a spot weld.

* * * * *